E. E. SULZER.
TOOTH CLEANER.
APPLICATION FILED MAY 18, 1907.

902,122.

Patented Oct. 27, 1908.

WITNESSES
S. M. Gallagher
J. Williamson

INVENTOR
Elizabeth E. Sulzer
BY
W. Truton Williamson ATTORNEY

UNITED STATES PATENT OFFICE.

ELIZABETH E. SULZER, OF PHILADELPHIA, PENNSYLVANIA.

TOOTH-CLEANER.

No. 902,122.　　　　Specification of Letters Patent.　　　Patented Oct. 27, 1908.

Application filed May 18, 1907. Serial No. 374,493.

*To all whom it may concern:*

Be it known that I, ELIZABETH E. SULZER, a citizen of the United States, residing at Philadelphia, county of Philadelphia, and State of Pennsylvania, have invented a certain new and useful Improvement in Tooth-Cleaners, of which the following is a specification.

My invention relates to a new and useful improvement in tooth cleaners, and has for its object to provide an exceedingly simple and effective device by which foreign matter may be removed from between the teeth without the use of a tooth pick and without the liability of injuring the teeth or filling which may be therein.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
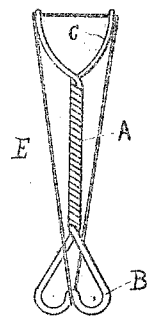
Figure 2:
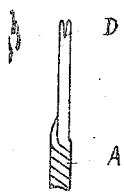

Figure 1 is a side view of my improvement showing a rubber band stretched thereon; Fig. 2, a detail view of the upper portion of the device showing the notch in one of the prongs of the fork for the insertion of the rubber, and Fig. 3, a side view of the fork illustrating a slightly modified form thereof.

In carrying out my invention as here embodied I take a single piece of wire and so twist it as to form the body or stem A, the handle B and the fork C, the latter having a notch at the extremity of each tine terminating in a narrow slit vertically disposed to the longitudinal axis of the wire as indicated at D to receive a strip of rubber E, which may be in the form of a band or other convenient shape, the handle B is here shown as heart-shaped, the depression therein adapted to receive the rubber band so as to stretch and hold it in the notches D.

In practice a rubber band is stretched upon the device and that portion of the band lying between the prongs of the fork is utilized to clean the teeth by being forced back and forth between the same, thus efficiently removing all foreign matter, it being obvious that the rubber will stretch, becoming of less thickness in cross section so that it will pass through any space however small.

One of the advantages of my improvement is that by the use of rubber the teeth cannot be injured as is often the case where tooth picks are used and especially metal picks, and another advantage of my improvement is that when the rubber becomes soiled it may be drawn away and another band readily substituted therefor.

Figure 3:
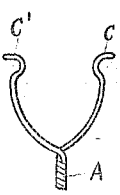

In Fig. 3 I have shown a slight modification of my improvement in which the ends of the fork are turned outward as indicated at C', and this arrangement will permit the securing of a rubber strip between the prongs of the fork by having the ends of said strip looped so as to go over the curved ends C' or by having a nipple or cap formed on each end of the rubber strip. When this construction is used the necessity for notching the ends of the fork is obviated.

Of course I do not wish to be limited to the material of which my improvement is made nor the design thereof as it might readily be made of sheet metal or casting or of celluloid or hard rubber molded into shape, the gist of my invention resting in the idea of providing a device having prongs from which is stretched a strip of rubber or other suitable material over the heart shaped loops formed in the end of the handle by its central indentation.

Having thus fully described my invention, what I claim as new and useful, is—

1. A tooth cleaner consisting of a single piece of wire so bent and twisted as to form a fork at one extremity, a twisted wire handle adjacent to the fork, loops on the end of the handle opposite to the fork and disposed in the same plane, an indented depression formed on the end of the handle by the divergence of the loops, a notch at the extremity of each tine of the fork terminating in narrow slits vertically disposed to the longitudinal axis of the wire and adapted to receive a band of elastic material, substantially as described.

2. A tooth cleaner consisting of a single piece of wire twisted to form a fork at one extremity, a notch in the extremity of each tine of the fork, said notch terminating in a narrow slit adapted to receive a band of elastic material, a twisted wire handle formed with the fork, loops formed on the end of the handle opposite to the fork, said loops being symmetrically and oppositely disposed and lying in the same plane as the fork, and adapted to receive the looped end of the elastic band, substantially as described.

In testimony whereof, I have hereunto affixed my signature in the presence of two subscribing witnesses.

ELIZABETH E. SULZER.

Witnesses:
S. M. GALLAGHER,
E. N. SCHOFIELD.